US006891952B1

(12) United States Patent
Puehlhoefer et al.

(10) Patent No.: US 6,891,952 B1
(45) Date of Patent: May 10, 2005

(54) DYNAMIC KEY GENERATION AND CONFIDENTIAL SYNCHRONIZATION OF ENCRYPTION COMPONENTS

(75) Inventors: Michael Puehlhoefer, Heidelberg (DE); Jochen Sandvoss, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,217

(22) Filed: Dec. 6, 1999

(30) Foreign Application Priority Data

Dec. 7, 1998 (DE) ........................................ 198 56 237

(51) Int. Cl.[7] .................................................. H04L 9/00
(52) U.S. Cl. ...................... 380/262; 380/259; 380/260; 380/265
(58) Field of Search ............................. 380/43, 46, 259, 380/260, 261, 262, 265, 283; 708/252

(56) References Cited

U.S. PATENT DOCUMENTS 4,815,130 A * 3/1989 Lee et al. .................... 380/265
5,720,034 A * 2/1998 Case .......................... 380/283
5,764,766 A * 6/1998 Spratte ....................... 380/262
6,445,794 B1 * 9/2002 Shefi ............................ 380/46

OTHER PUBLICATIONS

Halsall, Fred; Data Communications, Computer Networks and Open Systems; 1996; Addison–Wesley; 4th Edition; pp. 168–216.*

Schneier, Bruce; Applied Cryptography, 1996, John Wiley & Sons, Inc. 2nd Edition, 169–211, 421–428.*

* cited by examiner

*Primary Examiner*—Gilberto Barrón
*Assistant Examiner*—Jung Woo Kim
(74) *Attorney, Agent, or Firm*—William A. Kinnaman, Jr.

(57) ABSTRACT

This invention report describes the architecture of a system, which undertakes in a new way the dynamic generation of symmetrical keys and the confidential synchronization of encryption components which use these keys. The basis is formed by the principle of the one-time-pad, with which absolute confidentiality can be ensured in theory. The difficulties with practical implementation of a pure one-time-pad can be avoided by expansions.

28 Claims, 3 Drawing Sheets

DYNAMIC KEY GENERATION AND CONFIDENTIAL SYNCHRONIZATION OF ENCRYPTION COMPONENTS

BACKGROUND OF THE INVENTION

1. Field of the Invention

The present invention describes a method and a device for dynamic key generation and confidential synchronization of encryption components.

2. Description of the Related Art

Since the security of symmetrical encryption systems depends principally on the confidentiality of the keys used, the management of plaintext keys is critical to security in the highest degree. Key management includes the generation, storage and transmission of keys. To preserve the security of the system, the storage and transmission of keys require that these be encrypted in turn. Key hierarchies therefore occur frequently in practice. This increases the outlay on key management enormously. The security of the entire key hierarchy is also based on the confidentiality of the first key exchanged between the communication partners, which is used as the transport key for further keys to be exchanged. It is imperative that this key, to be exchanged as plaintext, is transmitted on a secure path so as not to jeopardize the security of the system as a whole.

Present cryptographic systems normally use symmetrical encryption methods to ensure the confidentiality of the data. Symmetrical encryption methods are those in which the transmitter and receiver use the same key. Cryptographic systems can be implemented both in software and hardware. The greatest measure of security can admittedly only be attained with hardware implementations which are able to prevent even persons who have direct access to the cryptographic components from spying out the keys. Data encryption is used for the most part to protect communication between spatially distributed systems, which are connected to one another e.g. by digital communications networks. In the case of symmetrical encryption methods, both communication partners must use the same key both for encryption and decryption. The security of the system as a whole therefore depends entirely on the confidentiality of the keys used.

The object of the present invention is therefore to propose a device and method that ensures that both key generation and the exchange of keys between the communicating systems are simplified, without attacks on the keys being possible by conventional methods.

SUMMARY OF THE INVENTION

This object is achieved by the present invention as set forth in the independent claims appended hereto. Other advantageous forms of execution of the present invention are set forth in the dependent claims.

The advantages of the present invention consist in the fact that key generation is effected on the principle of the one-time-pad method. It is thereby guaranteed that a new key is generated for each data transmission respectively. The invention described offers advantages when used in key management for symmetrical cryptosystems, in particular due to: (1) transparent key change from the viewpoint of the cryptographic application; (2) frequently possible key change, which is achieved without additional outlay for administrators or encryption software; and (3) easy, low-cost implementation capability in hardware.

A particularly simple form of implementation is achieved with this application if keys and data are transmitted via the same transmission channel. In this case, it is automatically guaranteed that the transmitter system and receiver system always use the same key for encryption and decryption.

BRIEF DESCRIPTION OF THE DRAWINGS

The present invention is described in greater detail with reference to preferred practical examples with reference to drawings, in which.

DESCRIPTION OF THE PREFERRED EMBODIMENT

Figure 1:
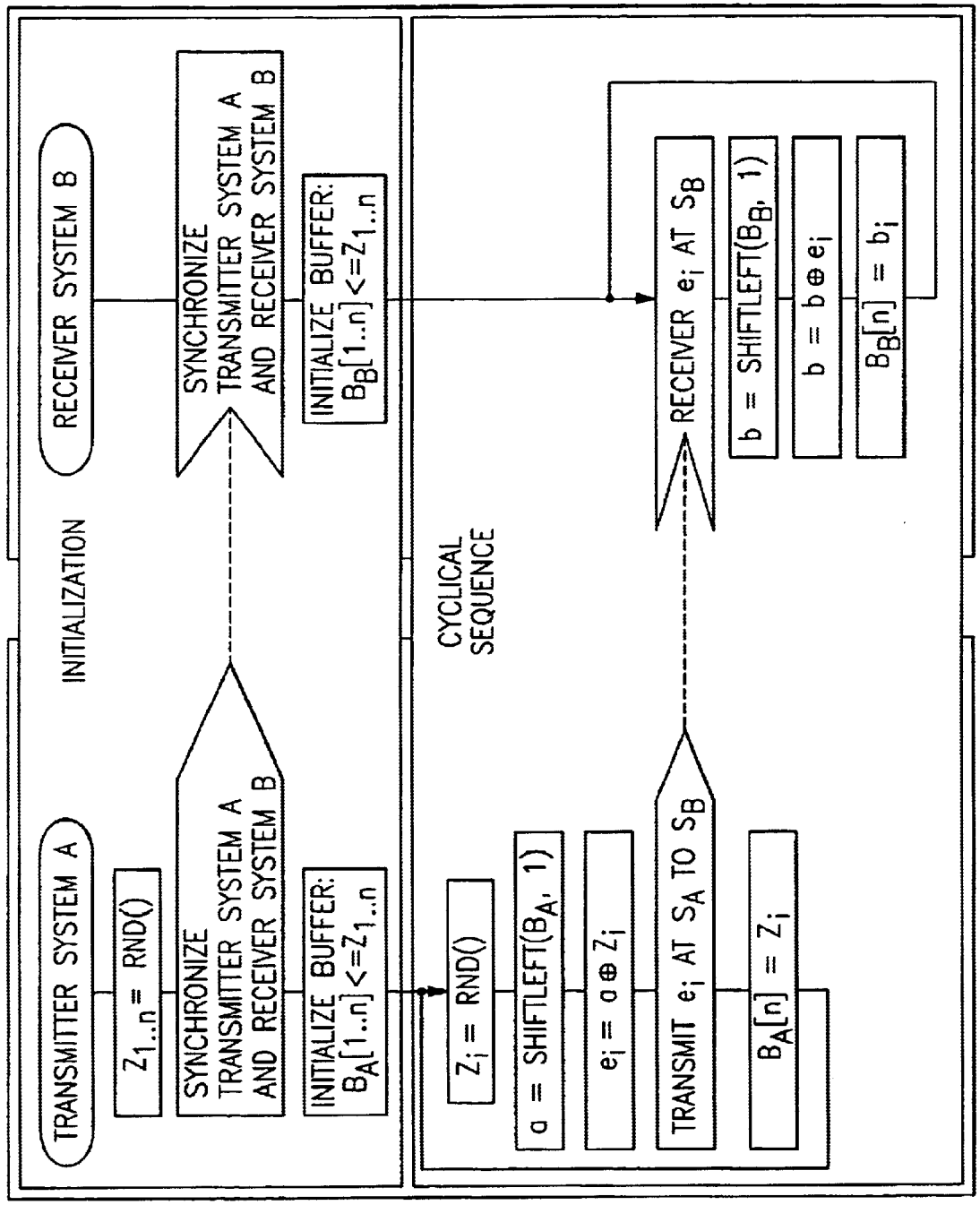
FIG. 1 shows the inventive method with reference to a flow chart.

The principle forming the basis of the invention is that of the one-time-pad. It is the prototype of all stream encryption. Combined by an XOR operation with the stream $a_1 a_2 a_3 \ldots a_N$ of plaintext bits is the key, which is a random sequence $k_1 k_2 k_3 \ldots k_N$ of bits. The output sequence appears completely random, so that for an attacker no chance exists of reconstructing the key or the plaintext, even if he has key sequences of any length used in the past and unlimited computing capacity. The disadvantage lies in the fact that the key is as long as the plaintext. This makes the one-time-pad very expensive and of limited practicality. In practice, the one-time-pad method is used only rarely in its pure form; however, it is the model for many algorithms, in which the genuine random number generator of the one-time-pad is replaced by a pseudorandom number generator. The actual key then only consists of a relatively small amount of data of constant length. Only this key then has to be transmitted; transmitter and receiver can generate the sequences for encryption or decryption with the aid of the pseudorandom number generator.

Admittedly, three conditions have to be met, which make use of the one-time-pad very expensive in practice: (1) the character string of the one-time-pad must be absolutely random; (2) the randomly generated character string for encryption of the message may only he used a single time; and (3) the transmitter and receiver must exchange the one-time-pad with one another in advance via a secure communications channel.

The present invention uses the principle of the one-time-pad to encrypt a randomly generated sequence of bits, which for its part serves as a key for a conventional symmetrical encryption process.

Transmitter system $S_A$ and receiver system $S_B$ (FIGS. 2–3) each have a buffer of identical length.

The buffers are initialized with identical random values. Transmitter system A also contains a random number generator or pseudorandom number generator ($ZG_A$), which is used for generating new keys. A random number generator is assumed here which can for example be realized by a hardware noise generator.

With each clock pulse of the system, transmitter system A generates a new random bit. The random bit is XOR-combined with the key bit at position 1 of the transmitter buffer and transmitted to the receiver. The values in the buffer of transmitter A are then displaced one position to the left. The new random bit is entered in the last position of the buffer.

The receiver system $S_B$ receives the bit sequence thus encrypted. It is XOR-combined beginning with the foremost key bit in the buffer and thus decrypted again. Here also the values in the buffer are displaced by one position to the left. The decrypted bit sequence is entered bit by bit at the last position of the buffer. In this way it is guaranteed that the buffer contents of $S_A$ and $S_B$ are always identical. The buffer contents cannot be deduced from the bit sequence of the transmission channel.

To initialize the system, identical random number values are entered into the buffers of the transmitter and receiver systems. This is effected via a secure channel. Both systems are preferably initialized directly on manufacture, or the buffers are initialized with the aid of chip cards, which contain a starting sequence.

It is assumed that the systems are connected to one another via a channel that detects transmission errors with the aid of suitable communication protocols and informs the end systems.

In the event of transmission errors, resynchronization of the transmitter and receiver systems is effected. A section in the buffer in each of these systems is defined for this (secure area), for which the values still remain synchronized even in the event of the largest transmission error to be assumed. If an error occurs, resynchronization is initiated. In this case all values outside the secure area are deleted and removed from the buffer. The (logical) size of the buffer is reduced accordingly. If the logical size of the buffer falls below a predefined minimum value, the system is stopped. In this case, the transmitter and receiver systems are reinitialized via a secured channel (e.g. chip card).

With the mechanism proposed, the security of a one-time-pad can virtually be achieved if the buffer used is sufficiently large. In this case, the keys generated are only themselves used after very long time-span to encrypt a key then generated.

FIG. 1 describes a specific implementation of the inventive method with reference to a flow chart.

Initially, one or more random values ($Z_1 \ldots n=Rnd0$) are generated either in the transmitter system A ($S_A$) or in the receiver system B ($S_B$). Several random values produce a key. These values are stored in a secured spatial environment in the buffer of both systems $S_A$ and $S_B$. In this regard the random values are stored in a defined sequence in both systems synchronously. This can be achieved for example by means of a shift register, which reads the incoming random values in from left to right. Thus identical values exist in both systems with the same position in the buffer. Initialization in a secured environment is thus completed, and the systems $S_A$ and $S_B$ can be transferred to an unsecured environment.

The systems $S_A$ and $S_B$ are then connected to one another via an unsecured transmission channel $\ddot{U}1$. The following method ensures that the random values from system $S_A$ can be transmitted securely to system $S_B$.

First, a new random value ($Z_i=Rnd0$) is generated at system $S_A$ by means of a random number generator. A genuine random number generator selects the values from a defined quantity in accordance with a sufficiently uniform distribution. With a uniform distribution, all events have the same probability. One option for a generator of this kind is a block cipher in output feedback or cipher feedback mode. Often, however, feedback shift registers are used for generating such random sequences.

The random values read into buffer A are then displaced to the left by one position. Due to this, the first random value at the left (e.g. random bit) drops out. This dropped-out value (bit) is combined by an XOR operation with a newly generated random value ($Z_i$). The result (e) of this operation is transmitted via the unsecured channel $\ddot{U}1$ to system $S_B$. The new random value ($Z_i$) in buffer A is also entered in the right position, which has become free.

In system $S_B$, the result e is XOR-combined with the first random value in buffer B on the left. Buffer B in system $S_B$ is then displaced by one position to the left and the result of the last XOR operation read in on the right at the last position in buffer B.

Thus identical buffer contents are obtained in respect of the position and content in the buffer, which contents are synchronized by means of the transmitted values (e).

Figure 2:
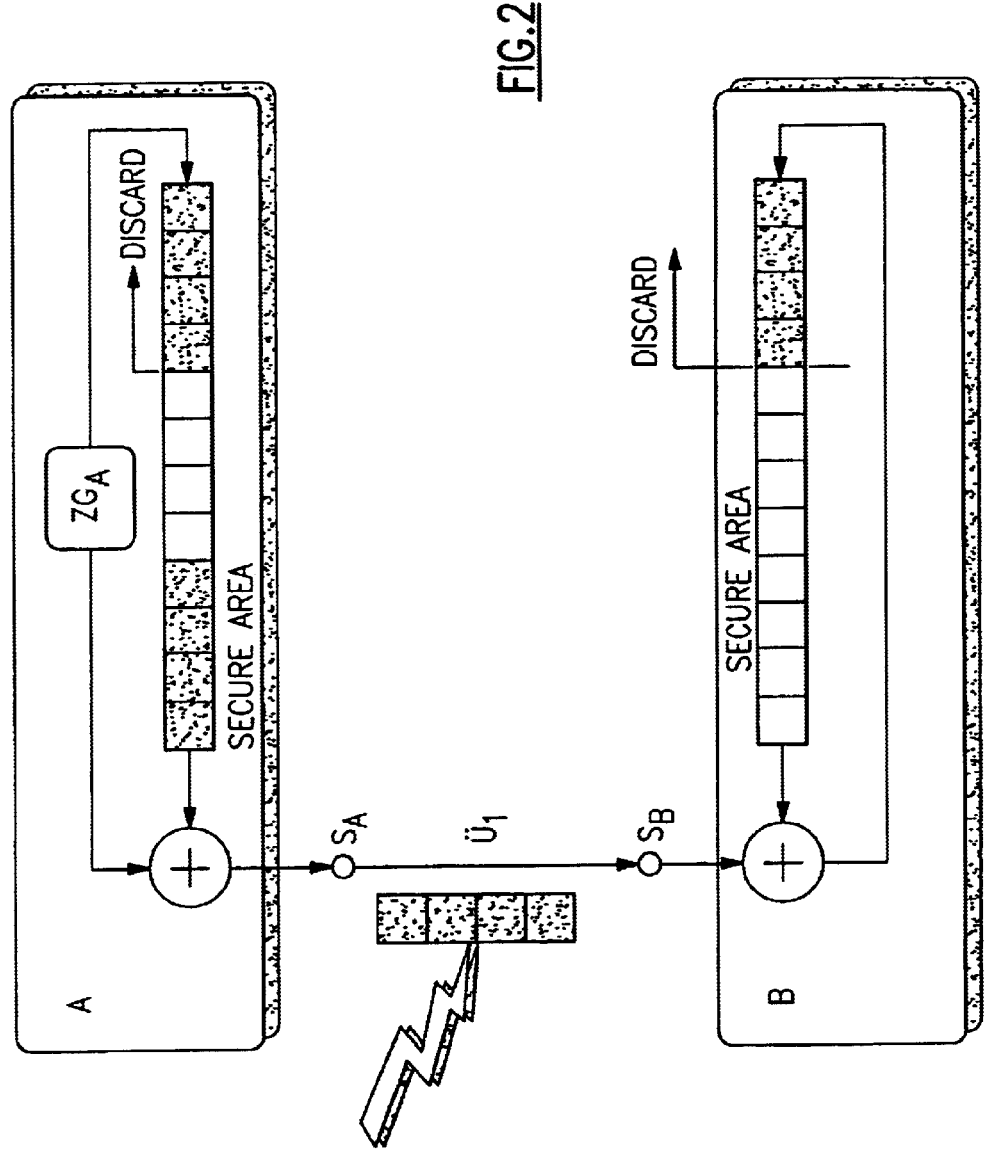
FIG. 2 shows a form of execution of the invention in the event of transmission errors occurring (resynchronization)

FIG. 2 describes a special form of execution of the present invention if transmission errors occur when transmitting random values from system $S_A$ to system $S_B$.

Due to the ongoing generation of random values (system clock pulse) in system A and the subsequent steps described above, the buffer contents in both systems are changed continuously.

If transmission errors should occur when transmitting the values, the consequence would be that the buffers of both systems would no longer be filled synchronously.

This is avoided due to the fact that, both in transmitter system $S_A$ and receiver system $S_B$, that part of the buffer of which the values are in the transmission channel is blocked for further storage of random values. The buffer store should be as large as possible with regard to this problem. It is assumed here that the systems are connected to one another via a channel $\ddot{U}1$, which detects transmission errors with the aid of suitable communications protocols and informs both systems.

Transmission errors can be largely reduced by technical measures (e.g. forward error correction).

Figure 3:
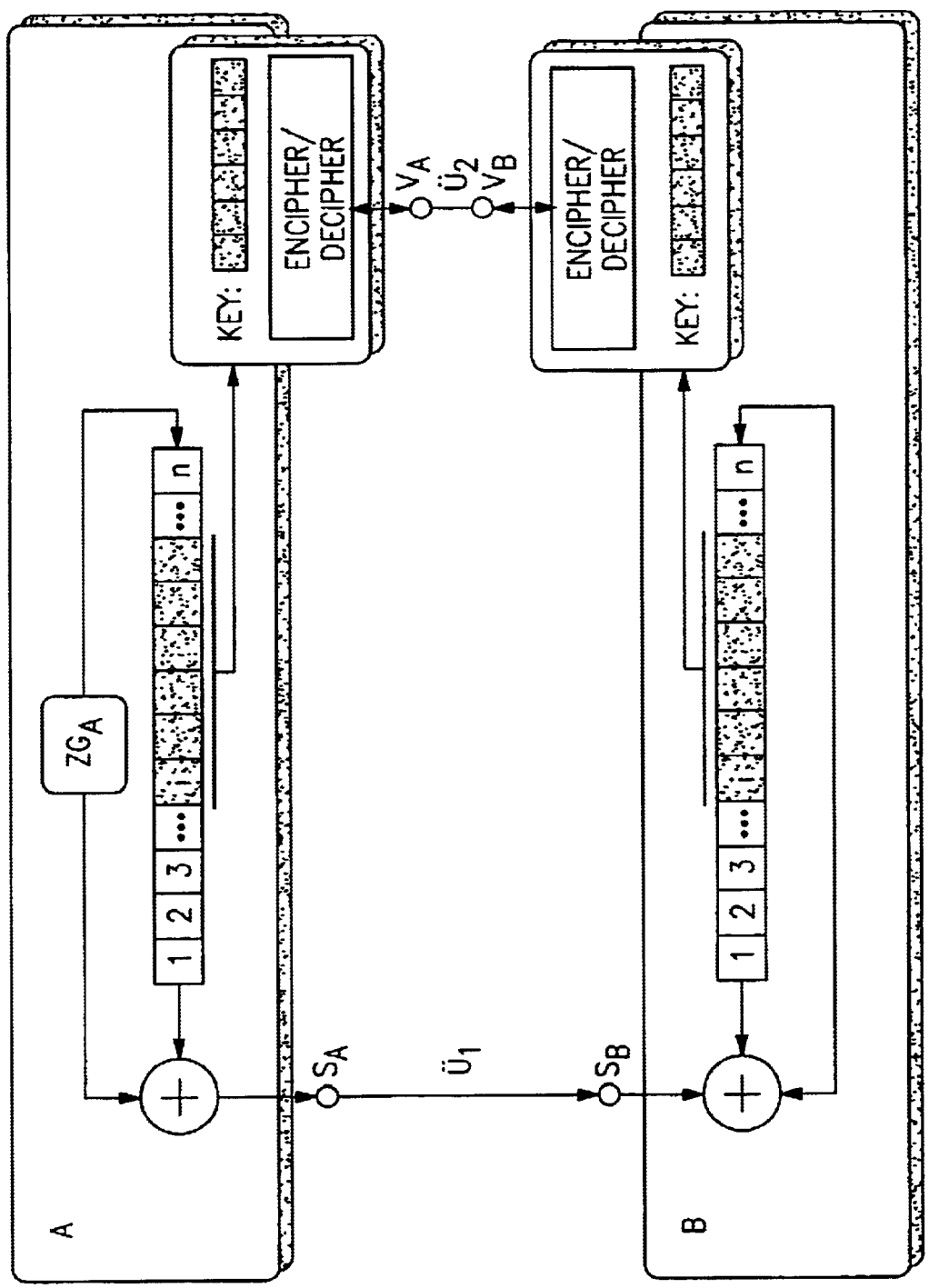
FIG. 3 shows an application of the present invention in key management.

FIG. 3 describes an application of the present invention for confidential synchronization of encryption components.

To encrypt or decrypt data on the communications path $\ddot{U}2$, any methods now considered as secure can be used. As the key, a bit sequence corresponding to the key length of the encryption algorithm being used is removed from each buffer and copied into the storage area of the corresponding encryption or decryption component ($V_A$, $V_B$). The bit sequence may on no account be used as a one-time-pad directly for XOR combining with the plaintext to be encrypted. This would infringe the principle of a one-time-pad, in which the key sequence may only be used a single time. Otherwise, the random data of the one-time-pad and thus the buffer contents could be ascertained by means of attacks using freely selected plaintext. It would then be possible to ascertain future bit sequences being used as the key of the cryptomethod.

To remove the bit sequence from the buffer, absolute synchronism is necessary between the communication partners with reference to the time and thus the position of the first key bit in the buffer (position 1). Synchronization can be achieved either explicitly by an application protocol between the components communicating with one another or implicitly by a feature that is inserted into the key data stream (sync character).

The application described offers advantages when used in key management for symmetrical cryptosystems, in particular due to: (1) transparent key change from the viewpoint of the cryptographic application; (2) frequently possible key change, which is achieved without additional outlay for administrators or encryption software; and (3) simple, low-cost implementation capability in hardware.

A particularly simple form of implementation is achieved with this application if keys and data are transmitted via the same transmission channel (Ü1=Ü2). In this case, it is automatically guaranteed that transmitter system and receiver system always use the same key for encryption and decryption.

Various modifications of the embodiments described above will be apparent to those skilled in the art. Thus, while the random values in the disclosed embodiment comprise bit values that are generated and processed one bit at a time, such random values could alternatively comprise larger units, such as byte values that are generated and processed one byte at a time.

What is claimed is:

1. A method for generating and securely exchanging a key between a transmitter and a receiver, comprising the steps of:
   a) securely storing identical sets of random values in a transmitter buffer associated with the transmitter and in a receiver buffer associated with the receiver so that identical values with identical positions exist in each buffer, each of said buffers having a defined logical buffer size;
   b) displacing the random values stored in the transmitter buffer by a defined amount so that a random value at one end of the buffer drops out of the buffer and a position at the other end of the buffer becomes free;
   c) generating a new random value representing a portion of the key;
   d) storing the new random value in the position in the transmitter buffer that has become free;
   e) combining the new random value with the random value that has dropped out of the transmitter buffer to produce a first result;
   f) transmitting the first result to the receiver;
   g) combining the first result with the value in the receiver buffer that corresponds in position to the value in the transmitter buffer that has dropped out due to displacement to produce a second result;
   h) displacing the random values stored in the receiver buffer by the same defined amount as in the transmitter buffer so that a random value at one end of the receiver buffer drops out of the buffer and a position at the other end of the receiver buffer becomes free;
   i) storing the second result in the position in the receiver buffer that has become free; and
   j) in response to a transmission error, reducing the logical buffer size of each of said buffers to correspond to a secure area in which values remain synchronized with corresponding values in the other buffer.

2. The method of claim 1 in which the random value is generated by means of a random number generator that is part of the transmitter.

3. The method of claim 2 in which the random number generator comprises a hardware noise generator.

4. The method of claim 1 in which step a) is effected in a secured environment.

5. The method of claim 1 in which initialization of the buffers in accordance with step a) is effected during manufacture of the transmitter and receiver.

6. The method of claim 1 in which initialization of the buffers in accordance with step a) is effected by a chip card that contains the random values as a starting sequence.

7. The method of claim 1 in which the sets of random values comprise bit sequences that are displaced by one bit position in steps b) and h) and in which the new random value generated in step c) comprises a random bit.

8. The method of claim 1 in which a random bit is generated with each clock pulse of the transmitter.

9. The method of claim 1 in which the sets of random values comprise byte sequences that are displaced by one byte position in steps b) and h) and in which the new random value generated in step c) comprises a random byte.

10. The method of claim 9 in which a random byte is generated with each clock pulse of the transmitter.

11. The method of claim 1 in which the first result is transmitted to the receiver over an unsecured transmission channel.

12. The method of claim 1 in which all random values outside the secure areas of the buffers are deleted when a transmission error occurs.

13. The method of claim 1 in which the process is stopped and the transmitter and receiver are reinitialized via a secured channel if the logical buffer size falls below a predefined minimum value.

14. The method of claim 1 in which steps b) through i) are performed iteratively for each of a plurality of generated random values representing portions of the key.

15. The method of claim 1 in which the combining steps comprise XOR-combining steps.

16. The method of claim 1 in which the first result is transmitted to the receiver over a first transmission, the method further comprising the steps of:
   k) encrypting plaintext data using key values stored in the transmitter buffer to generate encrypted data;
   l) transmitting the encrypted data to the receiver over a second transmission channel; and
   m) decrypting the encrypted data using key values stored in the receiver buffer to regenerate the original plaintext data.

17. The method of claim 16 in which the second transmission channel is the same as the first transmission channel.

18. The method of claim 16 in which the encryption and decryption steps comprise the steps of removing the stored key values from the transmitter and receiver buffers, the method further comprising the step of synchronizing removal of the stored key values from the buffers.

19. A program storage device readable by a machine, tangibly embodying a program of instructions executable by the machine to perform the method steps of claim 1.

20. A method for generating and securely exchanging a key between a transmitter and a receiver, comprising the steps of:
   a) securely storing a set of random values in a transmitter buffer associated with the transmitter, said buffer having a defined logical buffer size;
   b) displacing the random values stored in the transmitter buffer by a defined amount so that a random value at one end of the buffer drops out of the buffer and a position at the other end of the buffer becomes free;
   c) generating a new random value representing a portion of the key;
   d) storing the new random value in the position in the transmitter buffer that has become free;
   e) combining the new random value with the random value that has dropped out of the transmitter buffer to produce a result;
   f) transmitting the result to the receiver; and
   g) in response to a transmission error, reducing said logical buffer size to correspond to a secure area in which values remain synchronized with corresponding values in a receiver buffer.

21. A program storage device readable by a machine, tangibly embodying a program of instructions executable by the machine to perform the method steps of claim 20.

22. A method for generating and securely exchanging a key between a transmitter and a receiver, comprising the steps of:
   a) securely storing a set of random values in a receiver buffer associated with the receiver, said buffer having a defined logical buffer size;
   b) receiving a first result from the transmitter produced by combining a random value stored in a transmitter buffer with a newly generated value representing a portion of a key;
   c) combining the first result with the value in the receiver buffer that corresponds in position to the random value in the transmitter buffer used to produce the first result to produce a second result;
   d) displacing the random values stored in the receiver buffer by a defined amount so that a random value at one end of the receiver buffer drops out of the buffer and a position at the other end of the receiver buffer becomes free;
   e) storing the second result in the position in the receiver buffer that has become free; and
   f) in response to a transmission error, reducing said logical buffer size to correspond to a secure area in which values remain synchronized with corresponding values in the transmitter buffer.

23. A program storage device readable by a machine, tangibly embodying a program of instructions executable by the machine to perform the method steps of claim 22.

24. Apparatus for generating and securely exchanging a key between a transmitter and a receiver, comprising:
   a) means for securely storing identical sets of random values in a transmitter buffer associated with the transmitter and in a receiver buffer associated with the receiver so that identical values with identical positions exist in each buffer, each of said buffers having a defined logical buffer size;
   b) means for displacing the random values stored in the transmitter buffer by a defined amount so that a random value at one end of the buffer drops out of the buffer and a position at the other end of the buffer becomes free;
   c) means for generating a new random value representing a portion of the key;
   d) means for storing the new random value in the position in the transmitter buffer that has become free;
   e) means for combining the new random value with the random value that has dropped out of the transmitter buffer to produce a first result;
   f) means for transmitting the first result to the receiver,
   g) means for combining the first result with the value in the receiver buffer that corresponds in position to the value in the transmitter buffer that has dropped out due to displacement to produce a second result;
   h) means for displacing the random values stored in the receiver buffer by the same defined amount as in the transmitter buffer so that a random value at one end of the receiver buffer drops out of the buffer and a position at the other end of the receiver buffer becomes free;
   i) means for storing the second result in the position in the receiver buffer that has become free; and
   j) means responsive to a transmission error for reducing the logical buffer size of each of said buffers to correspond to a secure area in which values remain synchronized with corresponding values in the other buffer.

25. The apparatus of claim 24 in which the result is transmitted to the receiver over a first transmission channel, the apparatus further comprising:
   k) means for encrypting plaintext data using key values stored in the transmitter buffer to generate encrypted data;
   l) means for transmitting the encrypted data to the receiver over a second transmission channel; and
   m) means for decrypting the encrypted data using key values stored in the receiver buffer to regenerate the original plaintext data.

26. The apparatus of claim 25 in which the second transmission channel is the same as the first transmission channel.

27. The apparatus of claim 25 in which the encryption and decryption steps comprise the steps of removing the stored key values from the transmitter and receiver buffers, the apparatus further comprising means for synchronizing removal of the stored key values from the buffers.

28. The apparatus of claim 24 in which the buffers comprise shift registers.

* * * * *